Patented May 7, 1929.

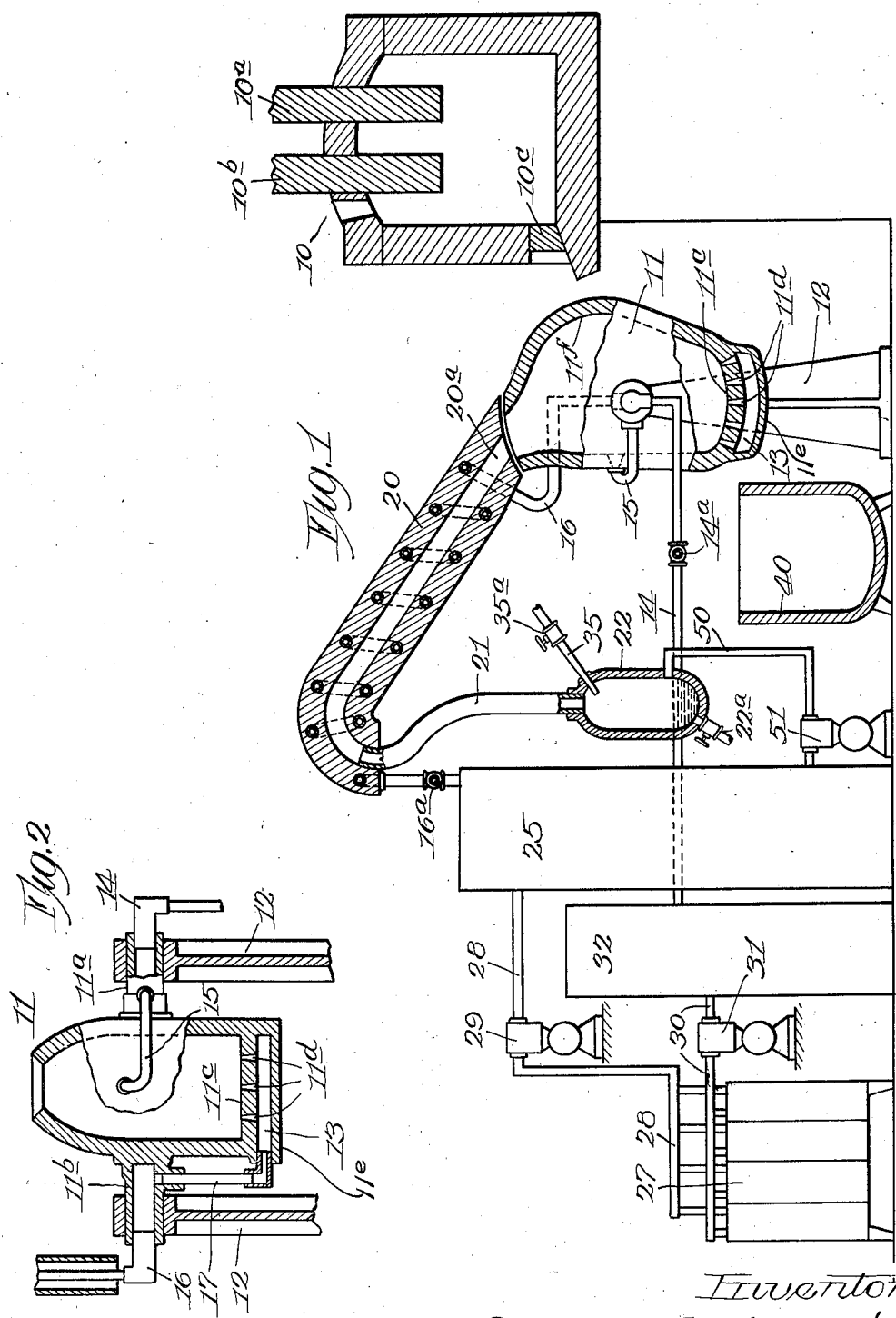

1,711,738

UNITED STATES PATENT OFFICE.

SAMUEL L. MADORSKY, OF CHICAGO, ILLINOIS, ASSIGNOR TO GATHMYS RESEARCH CORPORATION, OF CHICAGO, ILLINOIS, A CORPORATION OF ILLINOIS.

PROCESS FOR THE DIRECT REDUCTION OF IRON FROM ITS ORES.

Application filed February 1, 1926. Serial No. 85,122.

This invention relates to a process for the direct reduction of iron from its ores, and is especially adapted for a fractional reduction of iron from an ore containing titanium, silicon, manganese, and other components which are detrimental to the obtaining and recovery of the pure iron from its ore. This application is a continuation in part of my co-pending applications Serial No. 724,264 and Serial No. 71,310.

Other objects consist in the local generation of hydrogen and oxygen, supply of the former to the molten ore to effect reduction of the same, and supply of the oxygen thus produced to combine with the excess of hydrogen to maintain the heat of the molten mass above melting point, enabling the reduction to be carried on in an atmosphere devoid of carbon, nitrogen, or air; to salvage for re-use or other purpose the excess of hydrogen used in the process; to so treat the molten iron ores or the like to produce a substantially pure iron by a direct reduction and under controlled conditions, particularly as to temperature and containing gases.

These and other objects will be more fully described and set forth in the following specification.

In the accompanying drawings, I have illustrated apparatus, more or less diagrammatically, adapted to carry out my process. In the drawings:—

Figure 1 is a side elevation of the apparatus, portions thereof being broken away for illustrative purposes.

Figure 2 is a vertical section through the converter, a portion thereof being shown in elevation.

10 indicates generally a preliminary electric melting furnace of conventional construction, although it will be obvious that any other suitable melting furnace may be utilized. The furnace in the drawings is illustrated as having the electrodes 10ª and 10ᵇ, and an outlet portion 10ᶜ closed during the melting by a clay plug or the like. Located below and adjacent the outlet duct 10ᶜ is the converter 11 provided with the hollow trunnions 11ª and 11ᵇ journaled in the supporting standards 12, as shown for example in Fig. 2. This converter is provided with a false bottom 11ᶜ provided with the apertures 11ᵈ, the false bottom being spaced from the main bottom 11ᵉ to form a chamber 13. One side of the converter is provided with the bulge 11ᶠ. An oxygen supply duct 14 communicates with the hollow trunnion 11ª, and a pipe or tube 15 leads therefrom to the interior of the converter 11. A hydrogen supply duct 16 communicates with the other hollow trunnion, from which leads a tube or duct 17 to the chamber 13. An exhaust duct or chimney 20 is provided, open at its lower end at 20ª and discharging at its upper end through a pipe 21, which leads to a condensing chamber 22. The hydrogen tube 16 is coiled around in the wall of chimney 20 and extends therefrom to the hydrogen supply tank 25, a valve 16ª being provided in the hydrogen line for cutoff or control of the hydrogen supply. Located in the vicinity of the apparatus described is an electrolytic unit 27, comprising conventional cells for the electroylsis of water or the like in well-known manner, the hydrogen being taken off from the cathodes through a duct 28. Co-acting with the duct 28 is the compressor 29, the duct being continued to the hydrogen supply tank. Similarly a tube or duct 30 receives the oxygen from the anodes, conveys it to a second compressor 31, which delivers it through a continuation of the duct 30 to the oxygen tank 32. From the oxygen tank the oxygen supply duct 14 leads to the trunnion 11ª, as described above, a valve 14ª being inserted in the line for control of the oxygen supply. A spray nozzle 35 extends into the condensing tank 22 to spray a cooling liquid thereinto, the valve 35ª being provided to control this spray. From the tank 22 leads the valve discharge pipe 22ª to permit continuous or intermittent discharge of the spray liquid from the condensing tank. Located at one side of and below the converter 11 is the receiving ladle or pot 40. The upper end of the converter 11 is open at 11ˣ, and is of arcuate convex construction to lie closely adjacent the end of the chimney 20 when in the position shown in Fig. 1. From this position it may be swung either to the right to align with the discharge spout 10ᵉ of the melting tank, or to the left to discharge its contents into the pot 40.

In the practice of my process, molten ore of iron or other metal is charged into the converter 11 and is received in the bulged side 11ᶠ, so as not to obstruct or plug the apertures 11ᵈ. Hydrogen gas is then flowed through duct 16, and the converter is tilted to the position shown in Fig. 1, when the hydrogen will pass or bubble through the molten ore. The hydrogen is preferably supplied in an amount equal to twice the hydrogen combining with the oxygen content of the ore in order to insure the stability of the reduction reaction. I have found that the heat of the reduction reaction is far from sufficient to maintain the ore and iron reduced therefrom in molten condition, and in order to maintain this condition, which is necessary for the proper carrying out of the process, I supply oxygen through the pipe 15 above the surface of the molten ore or iron. This oxygen will combine with a portion of the excess of hydrogen over that utilized in the reduction of the ore, and the heat of this reaction will maintain the mass in molten condition.

As soon as the process is under way, the hydrogen supplied to the converter is pre-heated due to this discharge through the coils of the chimney 20, and this greatly increases the efficiency of the process. By generating the hydrogen and oxygen in the locality of the converter, I am able to obtain a supply of pure gases, and the oxygen which would otherwise be of value only as a by-product is available for the necessary heat maintenance of the reduction process.

The gas exhausting through the chimney 20 may contain a number of components, including hydrogen, which it may be desirable to salvage, and I have illustrated a diagrammatic arrangement for recovering the hydrogen. For example, this exhaust gas being greatly cooled by passage through the spray from nozzle 35, the other components of the exhaust gas may be condensed or absorbed and the hydrogen recovered through duct 50, compressed by compressor 51, and delivered into the hydrogen tank 35 for re-use. When the ore has been reduced to pure iron, the converter may be tilted to discharge its content into the pot or ladle 40, or the constituents necessary to produce various kinds of steel may be charged into the converter, and steel in this manner directly produced prior to discharge into the pot or ladle 40.

After discharge of the metal from the converter 11, it is tilted back to receive a fresh charge from the furnace 10, and in this manner the process may be carried on substantially continuously.

It is well known that there are large deposits of oxide iron ores containing a high percentage of titanium oxide, and in some instances silicon and other metals in oxide form. By the practice of the process described above, it will be apparent that after the process is under way, the air, nitrogen and carbon in the converter are excluded or driven from the converter 11, and the reduction is carried on in an atmosphere of hydrogen or water vapor resulting from the combustion of the hydrogen and oxygen. By maintaining this condition and by maintaining the temperature above the melting point of the oxide but below that at which the titanium oxide or silicon oxide would be reduced without carbon and nitrogen being present, the titanium and silicon compounds remain unreduced, and combine with the slag in a manner not interfering with the quality or composition of the reduced iron.

I thus effect what I term a fractional reduction in that the iron is reduced without appreciable reduction of the other elements which may be present in the molten ore such as manganese, aluminium, silicon, titanium, etc. Heretofore it has been impossible to obtain substantially pure iron by direct reduction from a titaniferous ore where, for example, excess of two per cent of titanium oxide is present in the ore. By my process, I have treated oxide iron ore containing as high as sixteen per cent titanium oxide, and have obtained by direct reduction pure iron substantially free from titanium. The slag formed during the reduction process remained relatively fluid as distinguished from a slag forming where carbon and nitrogen is present to affect the titanium oxide which renders the slag highly viscous and otherwise interferes with the process.

It will be seen, therefore, that two beneficial results are obtained by the control of the gas content of the converter and the temperature therein; first, the prevention of reduction of the titanium oxide and combination of the resultant titanium with the iron; and second, the prevention of the formation of a viscous slag.

The process should be basic, and if phosphorus be present or other substances which acidify the molten mass, sufficient lime should be added to render it basic. Also the linings in the melting furnace and converter should be basic.

It will be apparent that my process may be carried out in other forms of apparatus, and the particular practice hereabove described may be varied without departing from the spirit of the invention, and I do not wish to be restricted to the apparatus and process as described, except as I have defined the same in the appended claims.

Having now described my invention, what I claim is:

1. A fractional reduction of iron oxide ore containing titanium oxide, consisting in passing a reducing gas, such as hydrogen, through the oxide in molten form, maintaining the temperature of the mass above its melting point, and maintaining the reducing gas during its passage through the molten ore substantially free from carbon and nitrogen.

2. A fractional reduction of iron oxide ore containing titanium oxide, consisting in passing a reducing gas, such as hydrogen, through the oxide in molten form, maintaining the temperature of the mass above its melting point, and maintaining the reducing gas during its passage through the molten ore substantially free from nitrogen.

3. A fractional reduction of iron oxide ore containing titanium oxide, consisting in passing a reducing gas, such as hydrogen, through the oxide in molten form, maintaining the temperature of the mass above its melting point, maintaining the reducing gas during its passage through the molten ore substantially free from carbon and nitrogen, and introducing oxygen above the surface of the molten ore to combine with the excess of the reducing gas.

4. A fractional reduction of iron oxide ore containing titanium oxide, consisting in passing a reducing gas, such as hydrogen, through the oxide in molten form, maintaining the temperature of the mass above its melting point, maintaining the reducing gas during its passage through the molten ore substantially free from carbon and nitrogen, and introducing a gas whose greater part will combine with part or all of the excess of the reducing gas above the surface of the molten ore.

5. A fractional reduction of iron oxide ore containing titanium oxide, consisting in passing a reducing gas, such as hydrogen, through the oxide in molten form, maintaining the temperature of the mass above its melting point, maintaining the reducing gas during its passage through the molten ore substantially free from nitrogen, and introducing oxygen above the surface of the molten ore to combine with the excess of the reducing gas.

6. A fractional reduction of iron oxide ore containing titanium oxide, consisting in passing a reducing gas, such as hydrogen, through the oxide in molten form, maintaining the temperature of the mass above its melting point, maintaining the reducing gas during its passage through the molten ore substantially free from nitrogen, and introducing a gas whose greater part will combine with part or all of the excess of the reducing gas above the surface of the molten ore.

7. That step in the reduction of iron oxide ore containing titanium oxide, which consists in maintaining the reducing gas substantially free from nitrogen during its passage through the molten ore.

8. That step in the reduction of iron oxide ore containing titanium oxide, which consists in maintaining the reducing gas substantially free from carbon and nitrogen during its passage through the molten ore.

In witness whereof, I hereunto subscribe my name to this specification.

SAMUEL L. MADORSKY.